United States Patent
Zhao et al.

(10) Patent No.: US 7,603,633 B2
(45) Date of Patent: Oct. 13, 2009

(54) POSITION-BASED MULTI-STROKE MARKING MENUS

(75) Inventors: Shengdong Zhao, Scarborough (CA); Maneesh Agrawala, Seattle, WA (US); Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 11/332,104

(22) Filed: Jan. 13, 2006

(65) Prior Publication Data

US 2007/0168890 A1  Jul. 19, 2007

(51) Int. Cl.
*G06F 3/033* (2006.01)

(52) U.S. Cl. .................. 715/863; 715/834

(58) Field of Classification Search .......... 715/863, 715/834
See application file for complete search history.

(56) References Cited

U.S. PATENT DOCUMENTS

| | | | |
|---|---|---|---|
| 5,252,951 A * | 10/1993 | Tannenbaum et al. | 345/156 |
| 5,347,295 A | 9/1994 | Agulnick et al. | |
| 5,390,281 A | 2/1995 | Luciw et al. | |
| 5,500,935 A * | 3/1996 | Moran et al. | 715/863 |
| 5,502,803 A * | 3/1996 | Yoshida et al. | 715/530 |
| 5,509,114 A | 4/1996 | Moran et al. | |
| 5,509,224 A | 4/1996 | Roy | |
| 5,523,775 A * | 6/1996 | Capps | 345/179 |
| 5,570,113 A * | 10/1996 | Zetts | 345/173 |
| 5,666,438 A | 9/1997 | Beernink et al. | |
| 5,689,667 A * | 11/1997 | Kurtenbach | 715/810 |
| 5,802,388 A * | 9/1998 | Zetts et al. | 715/541 |
| 5,943,039 A * | 8/1999 | Anderson et al. | 715/810 |
| 6,348,936 B1 * | 2/2002 | Berteig | 715/856 |
| 6,486,874 B1 | 11/2002 | Muthuswamy et al. | |
| 6,492,981 B1 | 12/2002 | Stork et al. | |
| 6,573,883 B1 | 6/2003 | Bartlett | |
| 6,664,991 B1 | 12/2003 | Chew et al. | |
| 6,674,425 B1 | 1/2004 | Louis et al. | |
| 6,986,106 B2 | 1/2006 | Soin et al. | |
| 7,017,124 B2 * | 3/2006 | Jaeger | 715/863 |
| 7,055,110 B2 * | 5/2006 | Kupka | 715/863 |
| 7,123,244 B2 | 10/2006 | Lui | |
| 7,269,531 B2 | 9/2007 | Brouhon | |
| 7,283,126 B2 | 10/2007 | Leung | |
| 7,365,736 B2 | 4/2008 | Marvit et al. | |
| 7,454,717 B2 | 11/2008 | Hinckley et al. | |

(Continued)

OTHER PUBLICATIONS

Balakrishnan et al, The PadMouse:Facilitating selection and spatial positioning for the non-dominant hand, ACM CHI Conference on Human Factors in Computing Systems, 1998, pp. 9-16.

(Continued)

*Primary Examiner*—William L Bashore
*Assistant Examiner*—Ashraf Zahr
(74) *Attorney, Agent, or Firm*—Lee & Hayes, PLLC

(57) ABSTRACT

Provided is multi-stroke marking menu techniques that increase menu breath over an eight-item limit of some orientation-based marking menus. Zone and polygon menus can be provided wherein the breadth can be increased by a factor of about two or more while providing quick selection and maintaining selection accuracy. Various geometric attributes can be analyzed to determine a selection stroke. These attributes can include orientation, position, and/or length of each stroke. Hybrid techniques are also disclosed that further increase menu breadth and performance.

20 Claims, 13 Drawing Sheets

U.S. PATENT DOCUMENTS

| | | |
|---|---|---|
| 2002/0015064 A1 | 2/2002 | Robotham et al. |
| 2003/0231167 A1 | 12/2003 | Leung |
| 2004/0041798 A1 | 3/2004 | Kim |
| 2004/0135776 A1 | 7/2004 | Brouhon |
| 2004/0155870 A1* | 8/2004 | Middleton .................. 345/173 |
| 2005/0083300 A1* | 4/2005 | Castle ........................ 345/157 |
| 2005/0144574 A1* | 6/2005 | Chang ........................ 715/850 |
| 2005/0146508 A1 | 7/2005 | Kirkland et al. |
| 2005/0198593 A1* | 9/2005 | Keely et al. ................. 715/863 |
| 2006/0026535 A1* | 2/2006 | Hotelling et al. ............ 715/863 |
| 2006/0085767 A1 | 4/2006 | Hinckley et al. |
| 2006/0274944 A1 | 12/2006 | Tanaka et al. |
| 2008/0152202 A1 | 6/2008 | Moise et al. |

OTHER PUBLICATIONS

Buxton et al., Chunking and phrasing and the design of human computer dialogues, Readings in human computer interaction: Towards the year 2000, 1986, pp. 494-499.

Friedlander et al., Bull'seyelwhen Fitt's law does'nt fit, ACM CHI Conference on Human factors in Computing Systems, 1998, pp. 257-264.

Fitzmaurice et al., Tracking Menus, 2003, Toronto, pp. 71-79.

Kurtenbach, The design and evaluation of marking menus, 1993, University of Toronto.

Kurtenbach et al., The limits of expert performance using hierarchial marking menus, ACM CHI Conference on Human Factors in Computing Systems, 1993, pp. 35-42.

Kurtenbach et al., User learning and performance with marking menus, ACM CHI Conference on Human Factors in Computing Systems, 1994, pp. 258-264.

Kurtenbach et al., The HotBox: efficient access to a large No. of menu-items, ACM CHI Conference on Human Factors in Computing Systems, 1999, pp. 231-237.

Larson et al., Web page design: Implications of memory, structure and scent for information retrieval, ACM CHI Conference on Human Factors in Computing Systems, 1998, pp. 25-32.

McGUFFIN et a., FaST Sliders: Integrating Marking Menus and the Adjustment of Continuous Values, The Graphics Interface Conference; 2002, pp. 35-41.

Pook et al., Control menus: Execution and control in a single interactor, ACM CHI Conference on Human Factors in Computing Systems,2000, pp. 263-264.

Sellen, et al., The Prevention of Mode Errors through Sensory Feedback, Journal of Human Computer Interaction, 1992, pp. 141-164.

Wobbrock, et al. EdgeWrite: a style-based text entry method designed for high accuracy and stability of motion; ACM UIST symposium on User interface software and technology, 2003, pp. 61-70.

Zhao, et al. Simple vs. compound mark hierarchical marking menus, ACM UIST Symposium on User Interface Software and Technology, 2004, pp. 33-44.

Jacko, et al. "Hierarchical menu design: Breadth, depth, and task complexity." (1996) Perceptual and Motor Skills, 82, pp. 1187-1201.

Kiger. "The depth/breadth tradeoff in the design of menu-driven interfaces." (1984) International Journal of Man-Machine Studies, 20, pp. 201-213.

Raskin. "The Humane Interface: New Directions for Designing Interactive Systems." (2000) ACM Press.

Apitz, et al. CrossY: A Crossing-Based Drawing Application, UIST, 2004, pp. 3-12.

Appert, et al. Context matters: Evaluating interaction techniques with the CIS model; Proceedings of HCI 2004, Springer Verlag; 22 pages.

Bier, et al. Toolglass and Magic Lenses: The See-Through Interface; Proceedings of SIGGRAPH1993; Computer Graphics Annual Conference Series, ACM, 1993, pp. 73-80. http://citeseerx.ist.psu.edu/viewdoc/summary?doi=10.1.1.36.9741. Last accessed Feb. 18, 2009, 8 pages.

Buxton, et al. Continuous Hand-Gesture Driven Input, Proceedings of Grapics Interface '83, 9th Conference of the Canadian Man-Computer Communications Society, Edmonton, May 1983, pp. 191-195.

Buxton, et al.; A Study in Two-Handed Input. Proceedings of CHI 1986, vol. 17, Issue 4 (Apr. 1986), pp. 321-326, ACM 0-89791-18048—0321. http://portal.acm.org/citation.cfm?id=22390. Last accessed Feb. 18, 2009, 6 pages.

Card, et al. The Keystroke-Level Model for User Performance Time with Interactive Systems; Communications of the ACM, vol. 23, Issue 7 (Jul. 1980), pp. 396-410. http://portal.acm.org/citation.cfm?id=358895. Last accessed Feb. 18, 2009, 15 pages.

Clicky Mouse (pitrinec.com), Clicky Mouse Software Product, Published Aug. 31, 2000.

Dillon, et al. Measuring the True Cost of Command Selection: Techniques and Results; Apr. 1990; 7 pages.

Mynatt, et al. Flatland: New Dimensions in Office Whiteboards, CHI '99, 1999, pp. 346-353, Pittsburgh, PA, USA.

Guimbretiere. Fluid Interaction for High Resolution Wall-Size Displays, Ph.D. Thesis, Jan. 2002, Stanford University, 140 pages.

Kurtenbach, et al. Contextual Animation of Gestural Commands, Computer Graphics Forum, 1994, pp. 305-314, vol. 13, No. 5, Blackwell Publishers, Cambridge, MA, USA.

Goldberg, et al. Touch-Typing With a Stylus; Apr. 1993; 8 pages.

Guiard, Y.; Asymmetric Division of Labor in Human Skilled Bimanual Action: The Kinematic Chain as a Model; The Journal of Motor Behavior, vol. 19, No. 4, pp. 486-517, 1987. http://cogprints.org/625/0/jmb__87.html. Last accessed Feb. 18, 2009, 26 pages.

Guimbretiere, et al. FlowMenu: Combining Command, Text, and Data Entry, UIST, 2000, pp. 213-216.

Guimbretiere, et al. Fluid Interactions with High-Resolution Wall-Size Displays, Proceedings of UIST, 2001, pp. 21-30.

Hinckley, et al. Design and Analysis of Delimiters for Selection-Action Pen Gesture Phrases in Scriboli; CHI 2005 Apr. 2-7, 2005, Portland, Oregon, USA. ACM 1-58113-998-5/05/0004. http://www.cs.cornell.edu/~francois/Papers/2005-Hinckley-CHI05-Scriboli.pdf. Last accessed Feb. 18,2009, 10 pages.

Hinckley, et al. Quantitative Analysis of Scrolling Techniques. CHI 2002, Apr. 20-25, 2002, Minneapolis, Minnesota, USA. ACM 1-58113-453-3/02/0004. http://portal.acm.org/citation.cfm?id=503376.503389. Last accessed Feb. 18, 2009, 8 pages.

Hinckley, et al. Interaction and Modeling Techniques for Desktop Two-Handed Input; 1998; 10 pages.

Accot, et al. More Than Dotting the i's—Foundations for Cross-Based Interfaces, CHI, 2002, pp. 73-80. https://eprints.kfupm.edu.sa/51864/1/51864.pdf. Last accessed Jan. 10, 2006, 8 pages.

Johnson. Modes in non-computer devices; International J. Man-Machine Studies; 1990; 17 pages.

Hinckley, et al. Stitching: Pen Gestures That Span Multiple Displays, Advanced Visual Interfaces, May 25-28, 2004, pp. 23-31, Gallipoli, Italy, 9 pages.

Kurtenbach, et al. An Empirical Evaluation of Some Articulatory and Cognitive Aspects of Marking Menus, Human-Computer Interaction, 1993, pp. 1-23, vol. 8, Lawrence Erlbaum Associates, Inc.

Kurtenbach, et al. Issues in Combining Marketing and Direct Manipulation Techniques, UIST, 1991, pp. 137-144.

Li, et al. Experimental Analysis of Mode Switching Techniques in Pen-Based User Interfaces, CHI, Apr. 2-7, 2005, Portland, Oregon, USA, 10 pages.

Mackay. Which Interaction Technique Works When? Floating Palettes, Marking Menus and Toolglasses Support Different Task Strategies; Proceedings AVI; 2002 International Conference on Advanced Visual Interfaces; ACM; 6 pages.

Macenzie, I.S.; Fitts' law as a research and design tool in human-computer interaction; 1992; (pp. 91-139); 184 pages.

Mizobuchi, et al. Tapping vs Circling Selections on Pen-Based Devices: Evidence for Different Performance-Shaping Factors, CHI, Apr. 24-29, 2004, pp. 607-614, vol. 6, No. 1, Vienna, Austria.

Monk. Mode Errors: A User-centered Analysis and some Preventative Measures Using Keying-contingent Sound; International J. Man-Machine Studies; 1986; 16 pages.

Moran, et al. Pen-Based Interaction Techniques for Organizing Material on an Electronic Whiteboard, UIST, 1997, pp. 45-54. ACM 0-89791-881-9/97/10. Last accessed Jan. 10, 2006, 10 pages.

Moscovich, et al; Navigating Documents with the Virtual Scroll Ring; 2004; 4 pages.

Newman, et al. Denim: An Informal Web Site Design Tool Inspired by Observation of Practice, 2003; 66 pages.

OA Dated Feb. 5, 2009 for U.S. Appl. No. 11/245,850, 16 pages.

OA Dated Nov. 18, 2008 for U.S. Appl. No. 11/282,404, 36 pages.

OA Dated Sep. 17, 2008 for U.S. Appl. No. 11/245,850, 18 pages.

Pierce, et al. Toolspaces and Glances: Storing, Accessing, and Retrieving Objects in 3D Desktop Applications; Symposium on Interactive 3D Graphics; 1999; 6 pages.

Poller, et al. The Effect of Modes on Text Editing by Experienced Editor Users; Human Factors; 14 pages.

Zelenik, et al. Fluid Inking: Using Punctuation to Allow Modeless Combination of Marking and Gesturing, TR CS-04-11, 2004, Brown University, Providence, Rhode Island, 10 pages.

Saund, et al. Stylus Input and Editing Without Prior Selection of Mode, UIST, 2003, pp. 213-216.

Smart Technologies; Digital Vision Touch Technology; 2003; 10 pages.

Smith, et al. The Radial Scroll Tool: Scrolling Support for Stylus- or Touch-Based Document Navigation; 2004; 4 pages.

Tesler. The smalltalk environment; BYTE; 1981; 17 pages.

Buxton. A Three-State Model of Graphical Input, Human-Computer Interaction—Interact '90, 1990, pp. 449-456, Elsevier Science Publishers B.V., Amsterdam, 11 pages.

Buxton. Lexical and Pragmatic Considerations of Input Structures, Computer Graphics, 1983, pp. 31-37, vol. 17, No. 1.

Wilson. The Hand: How Its Use Shapes the Brain, Languages, and Human Culture, 1998, 397 pages, Random House of Canada.

Wing. I Timing and co-ordination of repetitive bimanual movements; Quarterly J. Exp. Psych 34A; 1982; 10 pages.

Zeleznik, et al. Fluid Inking: Modeless Integration of Gestures with Inking, 2004; Last accessed Apr. 18, 2006, 10 pages.

Zeleznik, et al. SKETCH: An Interface for Sketching 3D Scenes. Last accessed Jan. 10, 2006, 6 pages.

\* cited by examiner

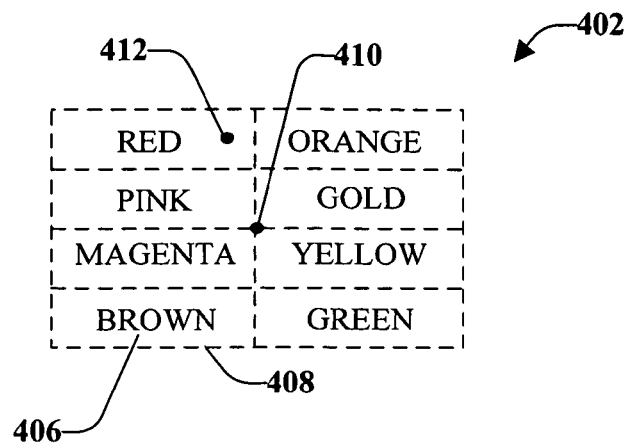
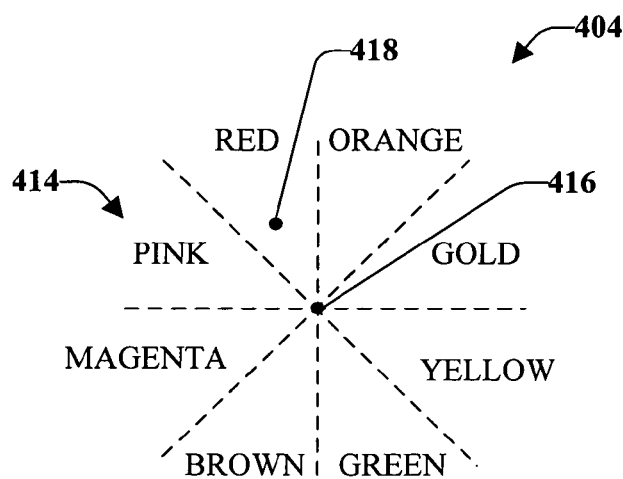
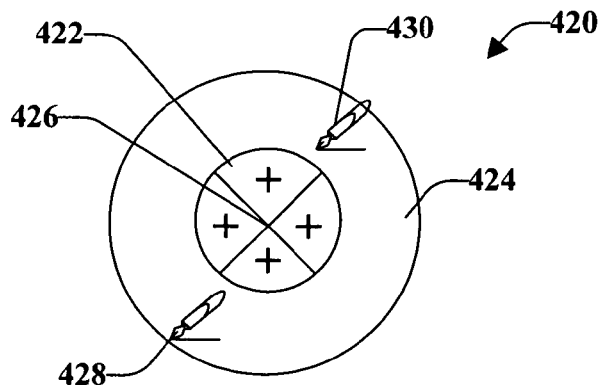
FIG. 4

POSITION-BASED MULTI-STROKE MARKING MENUS

CROSS-REFERENCE TO RELATED APPLICATIONS

This application is related to co-pending U.S. patent application Ser. No. 10/970,742, filed Oct. 20, 2004, entitled, "DELIMITERS FOR SELECTION-ACTION PEN GESTURE PHRASES" and co-pending U.S. patent application Ser. No. 11/245,850, filed Oct. 7, 2005, and entitled, "HOVER WIDGETS: USING THE TRACKING STATE TO EXTEND CAPABILITIES OF PEN-OPERATED DEVICES" and co-pending U.S. patent application Ser. No 11/282,404, filed Nov. 18, 2005 and entitled, "PHRASING EXTENSIONS AND MULTIPLE MODES IN ONE SPRING-LOADED CONTROL" the entirety of which are incorporated herein.

BACKGROUND

Marking menus are gesture-based menu selection techniques in which menu items are arranged radially and a user draws a stroke towards a desired item in order to select that item. Marking menus offer several features including selection strokes that are fast and easy to draw and an efficient novice to expert transition. However, a drawback of marking menus is that selection accuracy depends on the number of items that appear in the menu, referred to as "breadth." Accuracy can decrease substantially for marking menus of breadth greater than eight items (referred to as breadth-8).

Hierarchical marking menus increase the total number of menu items available by allowing users to select from multiple submenus using a compound zigzag stroke or other designated stroke. For users to maintain a reasonable accuracy rate of greater than ninety percent, a breadth-8 menu can have a depth of at most two levels, thereby providing access to sixty-four unique items. While a breadth-12 menu generally cannot maintain acceptable accuracy beyond depth-1, a breadth-4 menu can maintain good accuracy up to depth-4.

Breaking compound selection strokes into a sequence of inflection-free strokes has been proposed. Such multi-stroke marking menus can allow users to work with breadth-8 menus up to depth-3 (resulting in 512 unique items), at an accuracy rate of ninety three percent. These multi-stroke marking menus can also improve selection speed and accuracy while providing better space efficiency than compound-stroke marking menus.

Although increasing menu depth increases the total number of menu items available, these deep hierarchies suffer from several challenges. For example, deeper items take longer to access because the user must draw more complex strokes to select the desired item. While increasing breadth would generate shallower hierarchies, to maintain acceptable accuracy rates, both compound-stroke and multi-stroke marking menus are limited to breadth-8.

The limitation on menu breadth can also force an unnatural conceptual grouping of menu items. For example, consider a painting application that allows users to select brush colors from a palette of sixteen choices. Since marking menus are generally limited to breadth-8, the painting application uses a two level marking menu for color selection. The menu designer therefore must unnaturally divide the sixteen colors into many different groups. The breadth-depth tradeoff for general menu hierarchies has concluded that in most cases breadth is preferable to depth.

Therefore, to overcome the aforementioned challenges, there is a need for variants of multi-stroke marking menus that are designed to increase menu breadth while maintaining efficiency and ease of selection.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with extending the breadth of multi-stroke marking menus. The disclosed embodiments provide an effective marking menu that can include three main properties. First users are able to draw the selection strokes quickly and efficiently. Second, users can easily and reliably draw the strokes necessary to access any menu item. Third, users should be able to effortlessly learn how to operate the menu.

According to some embodiments, a user input can include a pen down event coupled with a tension event (e.g., pressing a button). Releasing the button before implementation of a menu selection can cancel the menu selection. A pen up event is compared to the pen down event to ascertain a relative position between the two events. The relative position indicates a menu selection, which can be automatically invoked at substantially the same time as the pen up event.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 4 illustrates exemplary position-based marking menus.

DETAILED DESCRIPTION

Figure 1:
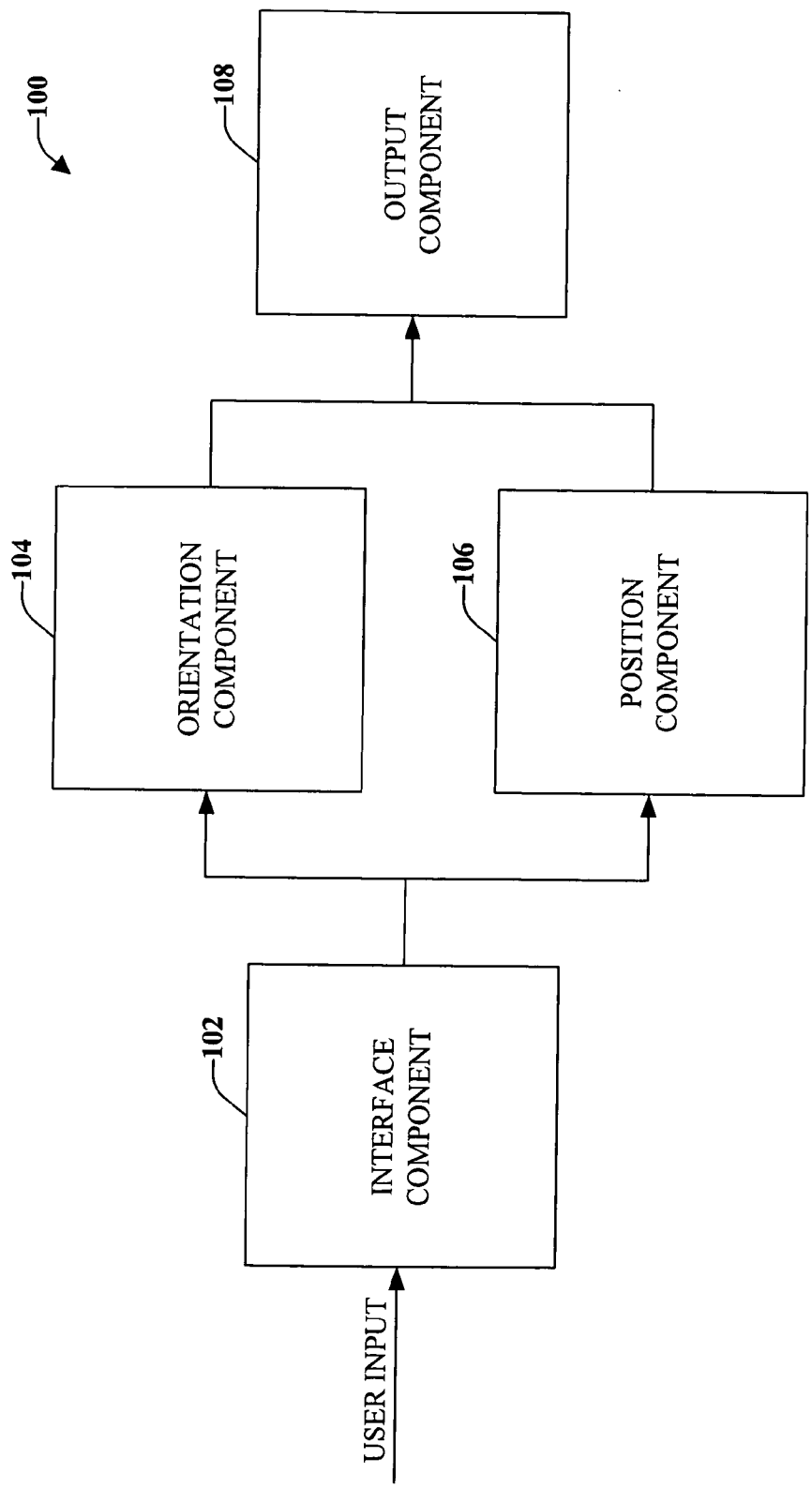
FIG. 1 illustrates a system that utilizes a relative position to increase the breadth of a multi-stroke marking menu.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component, "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used. The various embodiments disclosed herein can be performed on electrical devices that utilize touch screen display technologies and/or mouse-and-keyboard interfaces. Examples of such devices include computers (desktop and mobile), smart phones, personal digital assistants (PDAs), and other electronic devices both wired and wireless.

Referring initially to FIG. 1, illustrated is a system 100 that utilizes a relative position to increase the breadth of a multi-stroke marking menu. The system 100 can be utilized with a plurality of pen-operated devices that can range in size and include handheld devices, tablet PCs, tabletop displays, wall-sized displays, etc. System 100 includes an interface component 102 that accepts a user (e.g., the Internet, another system, a computer, . . . ) input, an orientation component 104 and a position component 106 that analyze parameters of the user input to perform a user desired function, and an output component 108 that outputs the desired function and/or a visible user interaction item.

By way of example and not limitation, interface component 102 can be a display or screen that utilizes touch-based technologies. A user can interface with system 100 utilizing various devices, provided the device is capable of being detected by interface component 102. Such devices include a pen, a pointer, a finger, a stylus, and/or any other object or device that provides pointing capabilities. The user input received by interface component 102 can be communicated to orientation component 104 and/or position component 106. In some embodiments, orientation component 104 and/or position component 106 can directly receive the user input. The user input can be a stroke, such as a pen stroke, intended to implement a menu (e.g., a list of choices that appears on the screen in response to a user action) and/or select a menu item, for example. A plurality of menus, submenus, commands, and other user selectable items can be utilized with system 100. The menu should balance breadth and depth with accuracy and speed.

The selection stroke should be geometrically simple and the precision necessary to draw the stroke should be just enough for the user to easily select each menu item. System 100 should also allow the user to draw the selection stroke any size since drawing strokes to a predetermined scale can be difficult. Therefore, scale-independent selection techniques utilized by system 100 can improve selection accuracy. In addition, the ability to draw shorter strokes can improve selection speed. The user should also be able to draw the selection strokes anywhere on the display. Menu selection techniques such as taskbars and tool palettes that force users to move to a specific invocation location can reduce selection speed because users must first move the selection device (e.g., pen) to the invocation location before making the menu selection. The user should also be able to draw a selection stroke without diverting attention to the drawing task and the stroke should be simple enough that it can be drawn using kinesthetic motor skills, without feedback from the system 100. In addition, eyes-free operation (e.g., operation without diverting visual attention) is useful for visually impaired users.

Novice users should draw substantially the same selection strokes as an experienced user. In this way, novice users rehearse the movement(s) necessary for experienced or expert performance and can learn the transition effortlessly. To increase learning, the location of each item in a menu hierarchy should reflect some conceptual hierarchy of the items. For example, in many applications the main menu bar offers a file menu that contains sub-items related to file operations.

In some embodiments, an input received by interface component 102, orientation component 104 and/or position component 106 can also include a user tension aspect (hardware or software) through which a user notifies system 100 or confirms that one or more strokes or gestures are intended to invoke a command and resulting manipulation of objects, menus selection, etc. For example, the user tension aspect can be a button in a non-preferred hand. Some embodiments can utilize the Ctrl key on a standard keyboard as the button. Other embodiments can utilize a touch sensor, touch pad, and/or one-dimensional touch-slider as the button, some of which can support additional functions such as bimanual scrolling. The entire display or bezel of a device can be a touch-sensitive surface, providing flexibility in placement of the gesture button.

Such tension techniques can signal to system 100 that a pointing device should transition from an inking mode to a menu or command gesture mode. Removal of user tension can indicate the cancellation or completion of the command and/or manipulation of objects, returning the pointing device to an inking mode. Inking mode refers to acts such as note-taking, drawing, and the like performed on an electronic display similar to pen and paper functions. Those skilled in the art will recognize that the default mode, referred to as "inking mode" herein, can alternatively be replaced by any other mode that an application uses as its "normal" mode of operation. For example, some applications may assign the "normal" mode as a selection mode, gesture mode, scrolling mode, dragging mode, or a user-selectable mode (e.g., airbrush, paintbrush, highlighter, etc.).

Orientation component 104 can be configured to analyze the user input to determine a user desired request, action, desired menu or menu item, etc. based at least in part on a direction of the user input. For example, the direction can be a stroke or gesture starting at a particular point or location and moving to a second location (e.g., upward and to the right, downward and to the left, horizontally, vertically, and the like). Orientation component 104 can also be configured to provide a visualization tool or guidance that illustrates a recommended gesture, inferred by system 100, to invoke an action based on, for example, whether the user is a novice user or an experienced user. Marking menu users can achieve experienced or expert level performance when they are familiar with the menu layout and can make selections without waiting for a menu visualization to be displayed. In addition, experienced users may group together the various marks that make a selection and, thus, execute the selection quickly. Orientation component 104 can be configured to ascertain whether the user is experienced or novice based on a plurality of criteria include a dwell time during which the user (or pointing device) pauses, and after a predetermined length of dwell time, a visible prompt is displayed to assist the user to complete the gesture.

Position component 106 can be configured to analyze the user input and determine the relative position of the user input in relation to a reference point (e.g., center of screen, predetermined position on screen, . . . ). The reference point or origin point can be utilized to analyze subsequent strokes. In some embodiments, position component 106 can be configured to establish the menu origin to a specified point or region of the input area, wherein each user input stroke should be positioned relative to this fixed origin. Position component 106 can further be configured to analyze a zone or region of the screen in which the user stroke travels. The zone or region of the screen can be related to the origin point and positioned substantially around the point of origin. According to some embodiments, a center of a tracking menu can be the reference point for a zone or polygon menu. Tracking menus are a type of menu that follow in close proximity to the pen position.

Figure 2:
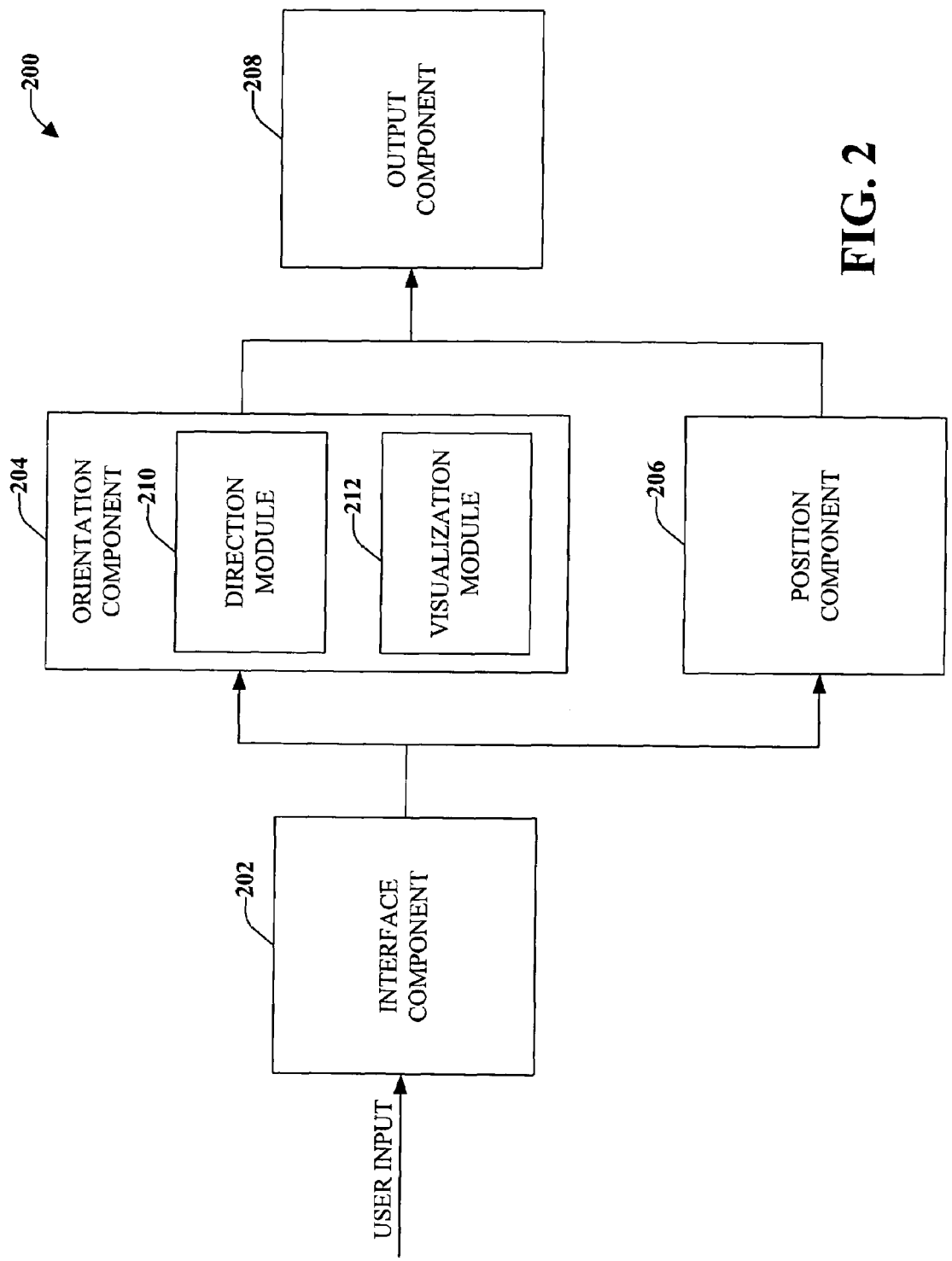
FIG. 2 illustrates a system for increasing the breadth of multi-stroke marking menus.

FIG. 2 illustrates a system 200 for increasing the breadth of multi-stroke marking menus. System 200 includes an interface component 202, an orientation component 204, a position component 206 and an output component 208. The interface component 202 can be configured to accept or receive a user input, such as a stroke or gesture, and output component 208 can be configured to display the result of the completed stroke (e.g., menu, command selection, . . . ) and/or to display a prompt to assist the user in completing a stroke to initiate a menu, command, etc. whereby system 200 infers the desired menu, command, etc. based on a stroke initiation.

Orientation component 204 and position component 206 can be configured to evaluate various parameters associated with a user input stroke or gesture and initiate a selection based on the input. For example, a user input can be a first stroke or tapping action that invokes a particular menu and/or establishes an origin. In addition or alternatively, the user input can include a stroke or gesture that, depending in part on a direction, can complete a user menu selection. For example, by gesturing or moving the pointing object upwards and toward the left, an "edit menu" may be invoked, the user may then move the pointing object in a subsequent direction to invoke a command on a submenu of the edit menu (e.g., undo, paste, find, . . . ). At substantially the same time as completion of the stroke or gesture, system 200 automatically performs the invoked command, menu item, and the like.

Orientation component 204 can include a direction module 210 and a visualization module 212. Direction module 206 can be configured to determine a direction of a stroke. For example, at substantially the same time as a menu is invoked (e.g., through a tapping action, a tension input, or other menu invoking means), a subsequent action, gesture, stroke, can specify which item in the menu should be implemented.

The command associated with the selected menu item is completed, provided the selection has not been cancelled (e.g., removal of a tension input prior to implementing the command, abort timeout, or other cancellation techniques). A plurality of cancellation techniques can be utilized with system 200. For example, a spring-loaded mode (quasimode) can be utilized to both activate and abort the menu. In such a mode, a user would press and hold a button for the entire interaction. The user can abort the action by releasing the button at any time before the selection is completed.

Visualization module 212 can be configured to operate in a novice mode or an expert mode. In novice mode, a menu visualization or user prompt would become visible on the screen to aid a user in learning, remembering, and/or deciding how to implement a menu or other selection. The visualization can fade-in for the current menu level if, for example, the user pauses at any point in the interaction for more than a predetermined period (e.g., 300 ms).

According to some embodiments, visualization module 212 can be configured to show many menu choices at substantially the same time. Increasing menu breadth may improve learning ability of a user and as the menu visualization displays more information, novice users can more easily find items. In accordance with some embodiments, additional menu items can be made available in an overflow menu that should only be available in a 'novice' visualization mode. For example, a list of items, similar to items 406-412 in FIG. 4, can be presented outside the menu for the user to tap on additional related but less frequently used menu items. There may or may not be a corresponding 'expert' mode gesture to select these items.

Figure 3:
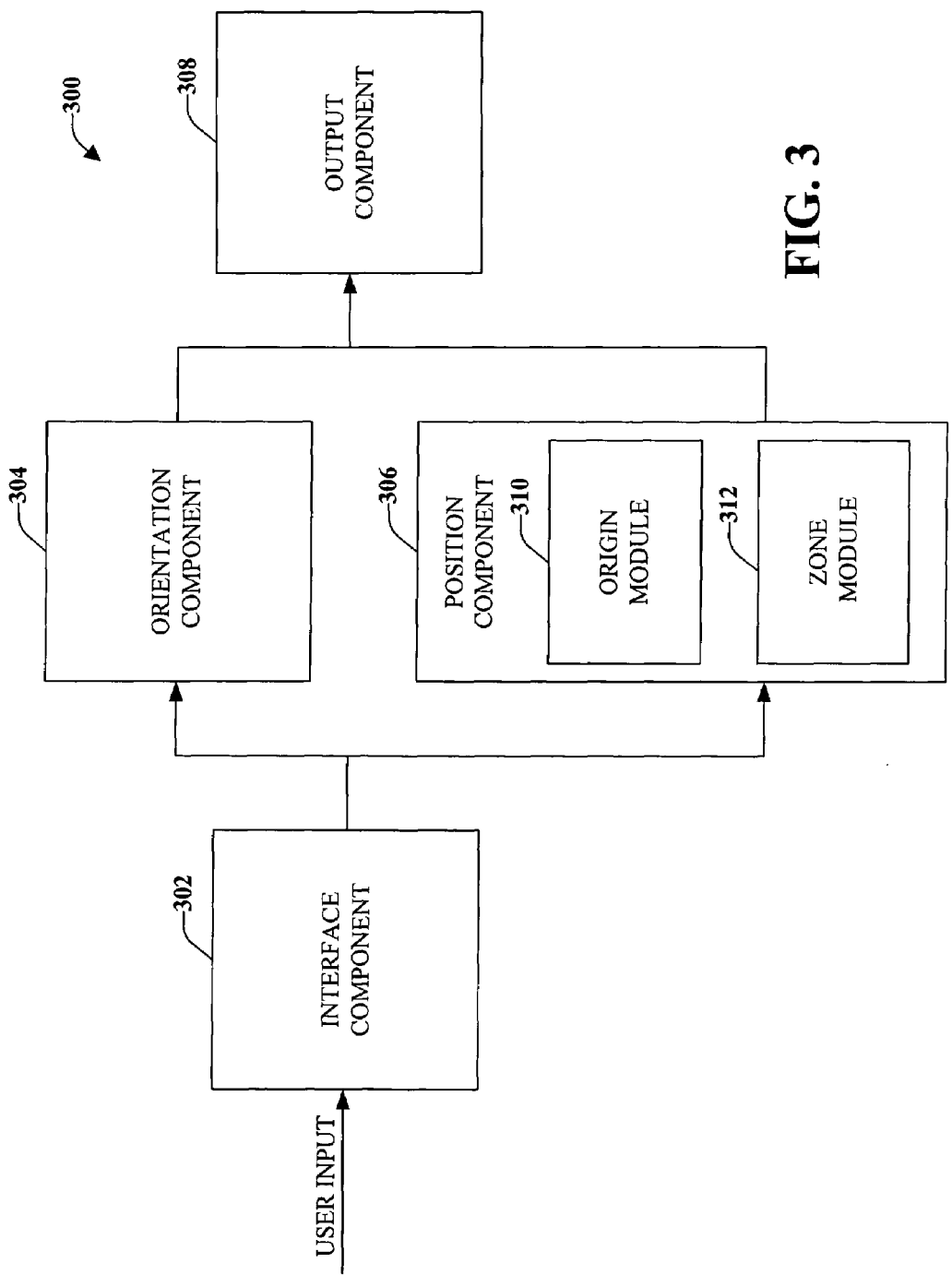
FIG. 3 illustrates another system that expands the capabilities of marking menus.

FIG. 3 illustrates a system 300 that expands the capabilities of marking menus. System 300 includes an interface component 302 configured to receive a user input, such as a tap on the screen (e.g., pen-down action), tension or pressure on a button (hardware or software, . . . ), and the like. The interface component 302 can convey the user input to an orientation component 304 and/or position component 306 that are configured to evaluate various parameters associated with a user input stroke or gesture and initiate a selection based on the input. In some embodiments, the user input can be provided directly to orientation component 304 and/or position component 306. Output component 308 can be configured to display a user prompt, a menu, or other user perceivable items relating to marking menus.

Position component 306 can include various modules including an origin module 310 and a zone module 312. Origin module 310 can be configured to recognize a first stroke and make a determination as to what that first stroke is meant to represent. The first stroke can be an initial tap that can be utilized by a position-based menu (e.g., zone-based, polygon-based) to determine a menu origin, which can be displayed for reference purposes. System 300 can selectively apply the user-defined menu origin. System 300 can further utilize the initial tap or stroke to consider the position of subsequent strokes relative to this origin. The initial tap can take into consideration in-place menu selection. In some embodiments, the initial tap can force a user to set their hand so it is easy for the user to draw a subsequent stroke about the origin.

Since the initial tapping takes time, it reduces selection speed. Therefore, according to some embodiments, an alternative technique includes establishing or fixing the menu origin to a specific point on the input area (e.g., display screen). With a fixed menu, the user should always position their strokes relative to this fixed origin. For a small, tightly constrained input area (e.g., touchpad of a laptop, screen of a small PDA) the user's hand should remain roughly centered over the input area. Thus, the center of the input area can serve as the menu origin and the user does not have to draw the initial tap, thus increasing selection speed.

It should be noted that for a large input area a fixed origin approach might not be practical. This is because users may not have their hand positioned near the center of the input area when the user needs to access the fixed origin menu. Selection speed would be reduced due to hand repositioning and users might need visual feedback from the system showing the zones in order to properly select the desired menu item. However, according to some embodiments, a fixed origin approach may be desired for devices with large input areas. According to some embodiments, other techniques for defining the origin can be utilized. For example, a prior stoke, such as a lasso gesture drawn to select items, may define the origin. Either the beginning point, end point, or centroid of the lasso stroke can operate as an origin for the position component, mitigating the need for an extra tap. The centroid of a tracking menu, as noted above, can offer another implicitly defined origin that can mitigate the need for a tap in some embodiments.

Zone module 312 can be configured to determine the location of a stroke in relation to the origin point. According to some embodiments, to utilize stroke position for menu selection the interaction surface is divided into zones and one item can be assigned to each zone. FIG. 4 illustrates exemplary types of position-based marking menus. A marking menu that utilizes rectangular zones is shown at 402 and a menu with open-ended radial zones is shown at 404. The user can position the starting point (e.g., pen down event) of the stroke in the appropriate zone to select a corresponding item. This approach can be utilized by tool palettes where each tool or menu item, such as 406 ("Brown"), corresponds to a separate rectangular zone, such as 408. For in-place selection, users can specify the origin of the palettes with a first stroke 410 and then specify the zone relative to this origin with the second stroke 412. As illustrated "RED" is selected with the second stroke 412. While utilizing such an approach, the length and orientation of the stroke are not considered. Thus, the strokes can be drawn by quickly tapping out dots rather than stroking out longer line segments.

It should be noted that rectangular zones 402 might not be scale independent. As such, the zone selected (e.g., 408) may depend on the distance between the two taps 410 and 412. As a result, such menus may be difficult to use in an expert mode when the visualization of the menu is not shown. Thus, a scale-independence can be provided utilizing an open-ended, radial zone-marking menu 404. This menu is created with a single open-ended zone 414 in each radial direction from the origin 416 of the coordinate system. A second tap 418 selects the item (e.g., "Red").

As illustrated at 420, according to some embodiments, a zone menu 422 can be integrated within a tracking menu 424. The center 426 of the tracking menu 424 can be a reference point for the zone menu 422. In this embodiment, a tap may not be needed before the stroke. The zone can be defined by a spatial region that the pen 428 or 430 lands within. Although a 4-way zone menu is illustrated, up to 8 zones with up to 8 orientations can be possible and each zone menu selection could be a hierarchical menu, if desired. As illustrated, the zone menu can have regions rotated by about 45 degrees or any rotation angle. The user can select a function of the outer-ring 424 area by selecting a command from the inner ring 422. The next pen down in the outer ring 424 can reapply the same command, resulting in a quick repetition of the same command without the need to articulate the entire command selection again. While a zone menu integrated within a tracking menu is illustrated, some embodiments can utilize a polygon menu integrated with a tracking menu.

Figure 5:
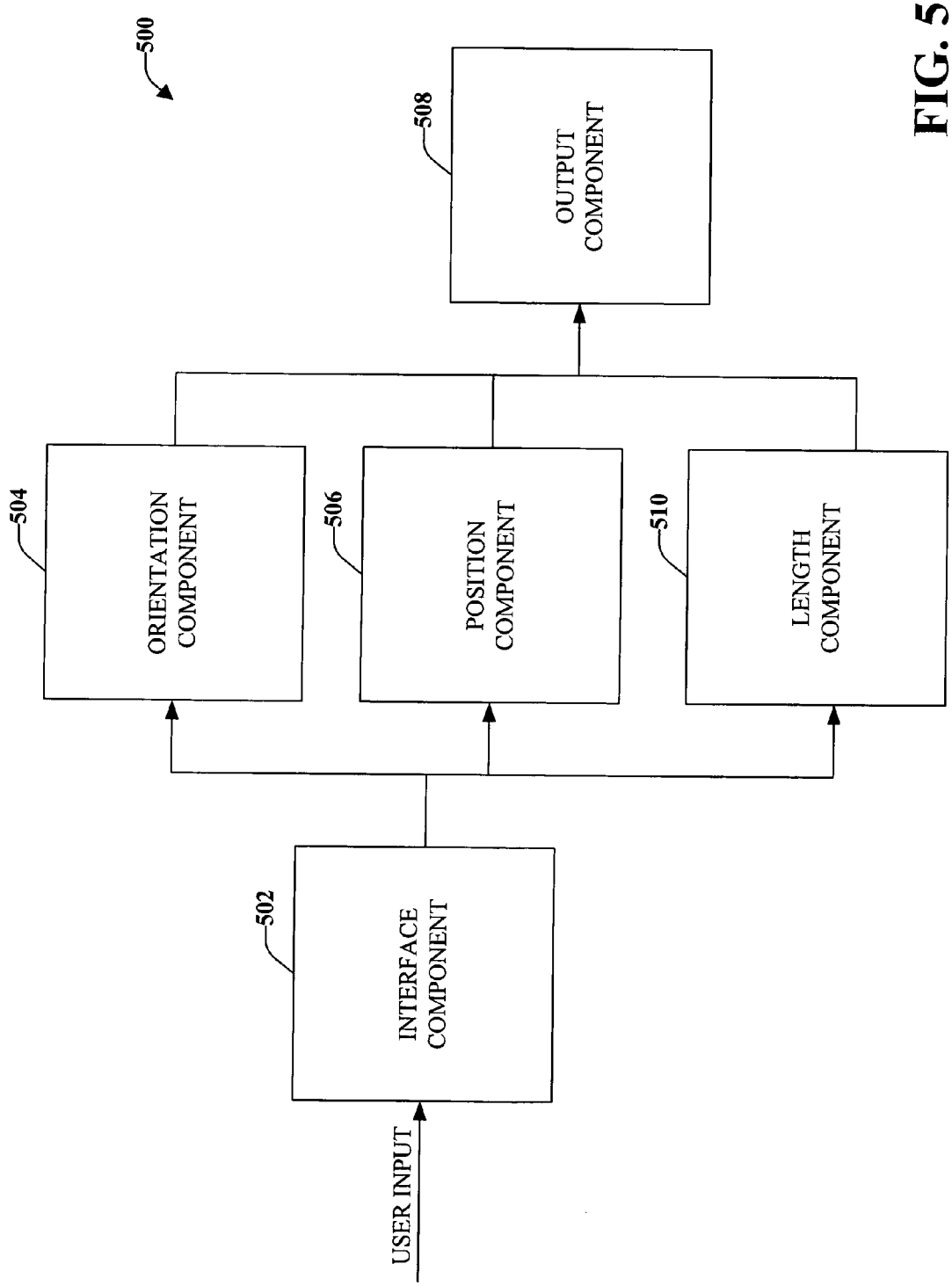
FIG. 5 illustrates another system that expands the capability and breadth of a marking menu.

FIG. 5 illustrates another system 500 for expanding marking menu capabilities. System 500 is similar to the systems shown in FIGS. 1-3. Orientation, length, and position are independent attributes of a straight-line stroke. Treating strokes as line segments provides that the internal shape of the stroke does not matter, and is therefore easy for a user to draw. In some embodiments, if a user does not draw a straight line, it does not affect the selection. Therefore, menu selection techniques can analyze two or more of these attributes simultaneously. System 500 includes an interface component 502 that can receive a user input, an orientation component 504 and a position component 506 that analyze parameters of the user input to perform a user desired function, and an output component 508 that outputs the desired function and/or a visible user interaction item.

Also included in system is a length component 510 that can compute a length of a stroke with respect to any natural scaling unit (e.g., pixels, inches, centimeters, and the like). Stroke length can be utilized to provide interactive control over a continuous parameter. For example, standard orientation-based marking menus may be combined with length-based dragging to control parameter values. A combination of time-out with stroke length can be utilized. When a user makes a stroke, the object (e.g., pen) may leave the proximity of the screen. During the time that the object is not detected by the display screen, the user intent may be unclear (e.g., should action be cancelled, is user preparing for the next stroke, . . . ). Thus, according to some embodiments, if the object is removed from the screen, after a predetermined amount of time (e.g., 600 ms) the previous action is cancelled and a default mode (e.g., inking) is entered.

Length component 510 can be utilized with hybrid marking menus that include an orientation-based menu with a position-based menu. Thus, a single marking menu can include an orientation-based menu, a zone-orientation menu and/or a polygon-orientation menu. These menus will be discussed in further detail below.

It should be noted that some embodiments could analyze curvature of the stroke, which is an attribute that may differ at each point on the stroke. Analyzing curvature, however, is a slower and potentially less accurate technique than treating strokes as simple line-segments. Consideration of curvature and/or inflection points may offer a design option to further increase the number of commands available from a single level of a menu, but may incur the cost of some reduction to accuracy rates. This is an application-specific and/or user-specific design decision, however, and thus the use of curved or zigzag strokes is feasible in some embodiments of zone and polygon menus. Other embodiments can utilize time-based information, such as stroke velocity and acceleration, or hardware specific properties such as pen pressure or tilt angles of the pen can provide additional channels of information for improving gesture-based menu selection.

Figure 6:
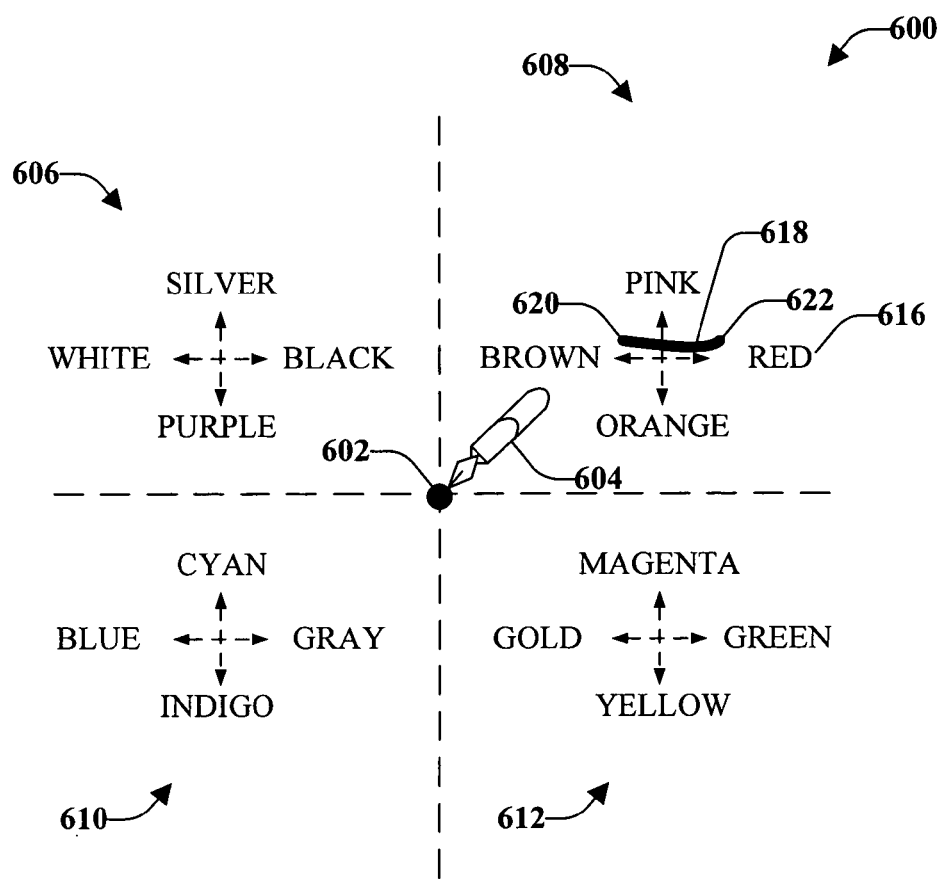
FIG. 6 illustrates a zone-marking menu that can be utilized with various embodiments disclosed herein.

FIG. 6 illustrates a zone-marking menu 600 that can be utilized with various embodiments disclosed herein. The zone menu 600 can be hierarchical and both the zone and orientation can be changed from stroke to stroke. However, the initial tap (if any) used to set the menu origin has to be drawn once. An initial stroke can be drawn as a dot or tap 602. In some embodiments, the menu could be implemented to allow a user to tap more than once, if desired. For example, an extra tap at any level of the menu could be utilized to offer a different set of command choices.

It should be understood that while a pen 604 is illustrated, the various embodiments disclosed herein can work with any device and/or object (e.g., pen, finger, marker, pointer, stylus, mouse, . . . ) provided the device and/or object is capable of pointing and system is capable of recognizing the device or object. The positioning of the tap 602 on the screen can specify the origin of one or more zones. Illustrated are four zones oriented around the tap point 602, a first zone is in the upper left 606, a second zone is in the upper right 608, a third zone is located in the lower left 610, and a fourth zone is located in the lower right 612. The breadth of the zone-marking menu 600 can be a factor of the number of zones and the number of stroke orientations recognized within each zone. Each of the illustrated zones 606, 608, 610, and 612 allows four stroke orientations. Thus, the total menu breadth for the zone-marking menu 600 is sixteen items.

After the origin 602 of the menu is determined, subsequent strokes can be drawn as line-segments and the item that is selected is a factor of which zone the starting point (e.g., pen down event) of the stroke falls within as well as the orientation of the stroke. For example, to select the menu item "RED" 616, a starting point of a second stroke (if a first stroke is a tapping action utilized to set the point of origin) should be located in the upper left zone 608. In addition, the second stroke should be drawn in the horizontal orientation from left to right. A representation of the second stroke is shown at 618, where 620 is the starting point of the stroke and 622 is the ending point (e.g., pen up event) of the stroke. It should be understood that the second stroke 618 could be located anywhere within zone 608, provided it travels in the appropriate direction to invoke the desired command. For example, in zone 608 the following directions will invoke the listed commands: left to right for red, right to left for brown, top to bottom for orange, or bottom to top for pink. The appropriate directions for the other zones 606, 610, and 612 operate in a similar manner to invoke the listed colors.

Figure 7:
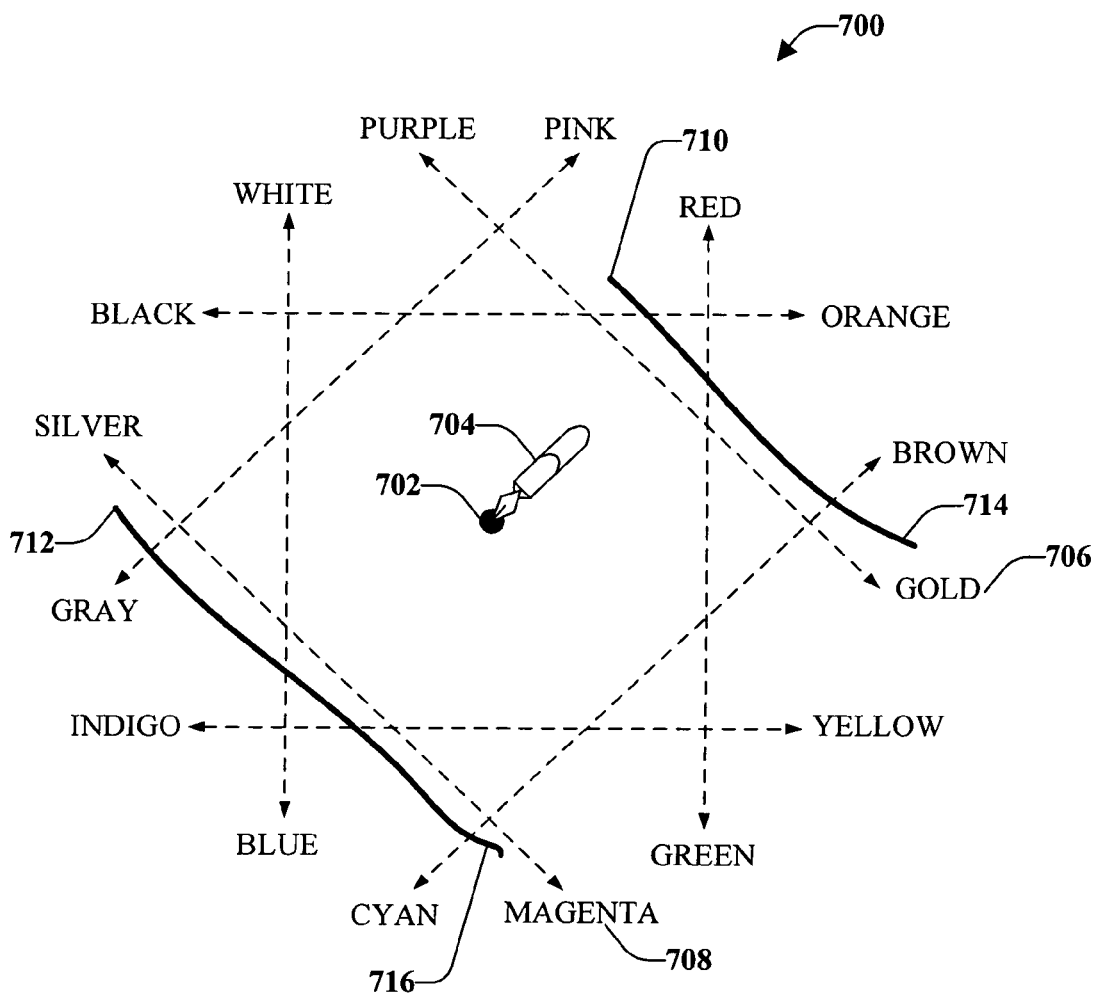
FIG. 7 illustrates a polygon menu that can be utilized with various embodiments disclosed herein.

FIG. 7 illustrates a polygon menu 700 that can be utilized with various embodiments disclosed herein. Polygon menu 700 allows a user to select menu items by drawing strokes corresponding to the edges of an N-sided polygon. Each edge can be utilized to select one of two items depending on the direction in which the stroke is drawn. Thus, the breadth of an N-sided Polygon menu is 2N.

An initial tap 702 from an object or device, such as the illustrated pen 704 sets the origin of the menu 700. The orientation and position of subsequent strokes can be analyzed to determine the user desired command. In an even sided polygon, opposite edges have substantially the same orientation. For example, the orientation for selecting "Gold" 706 and the orientation for "Magenta" 708 have the same orientation, both start at a first point 710 and 712, respectively, and travel downward and to the right, 714 and 716, respectively. Therefore, the orientation of the stroke can mitigate the possibility of all but two edges of the polygon. Note that these two edges lie on opposite sides of the menu origin 702. To disambiguate between the two similar selections (e.g., Gold and Magenta), the interaction surface can be split into two half-plane zones orientated parallel to the edge and running through the menu origin 702. The stroke and the polygon edge it represents should then lie in the same half-plane.

Polygon menu 700 can be utilized to support motion-impaired users. For example, a four-sided Polygon menu essentially forms a square box about the menu origin and provides breadth-8 menus. Thus, the selection strokes are along edges of the box and this technique can be amenable to motion impaired users, while also potentially increasing selection performance for able-bodied users as well.

While the zone menu 700 of FIG. 7 can have a fixed shape for each zone, depending on the total number of zones, a polygon menu, on the other hand, can dynamically adjust the orientation of the zones based on the orientation of the stroke. Since polygon menus utilize zones that are generally the size of entire half-planes orientated roughly parallel to the stroke, less precision is necessary by the user when positioning the starting point of a stroke.

Figure 8:
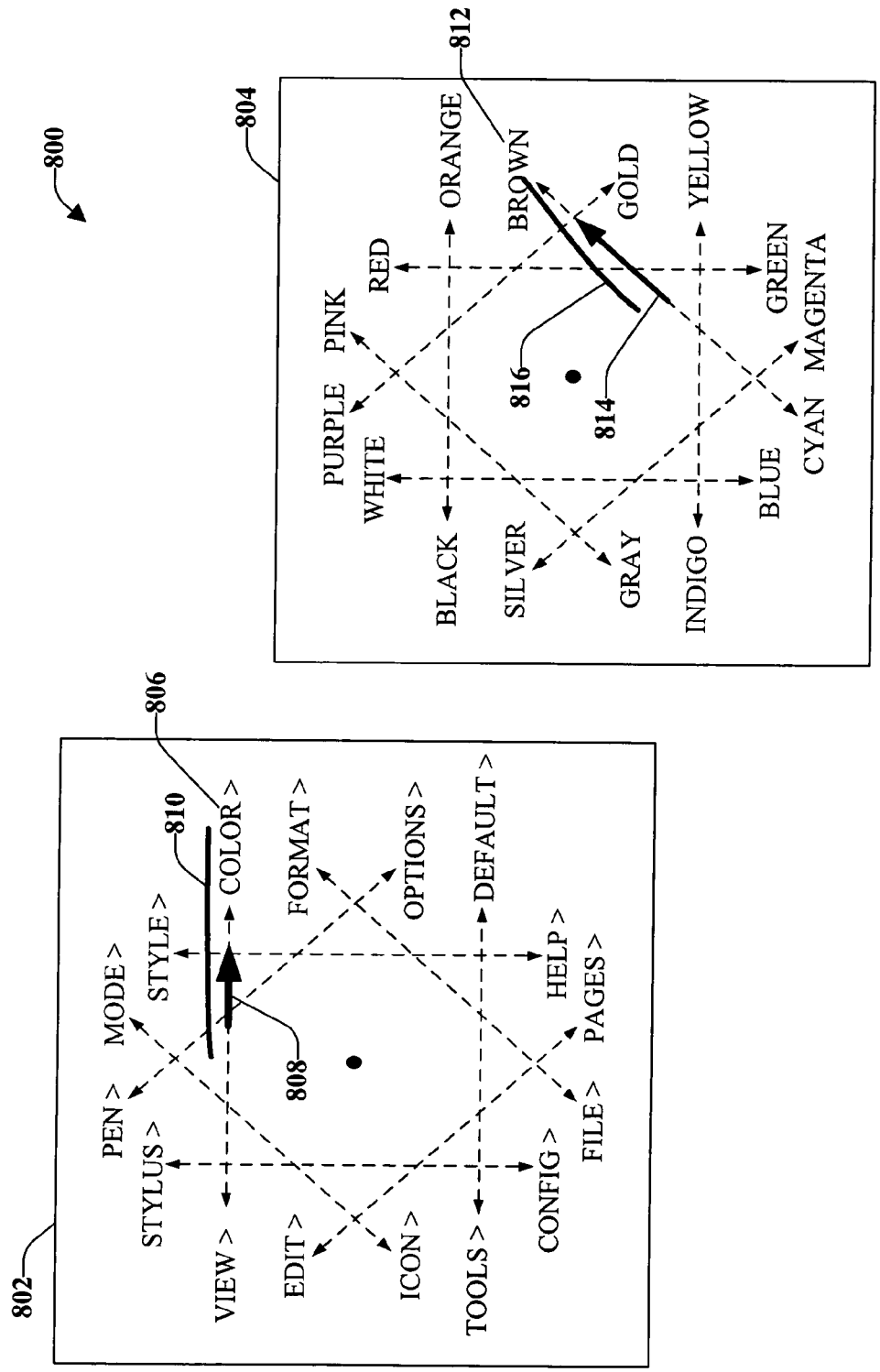
FIG. 8 illustrates a polygon menu with a menu visualization that appears during novice mode.

FIG. 8 illustrates a polygon menu 800 with a menu visualization that appears during novice mode. Polygon menu 800 is a 16×16 menu having two levels. It should be understood that a polygon menu could be a different size than the menu illustrated and described. First level 802 can be a main menu and second level 804 can be a submenu of the main menu. A user can select a menu item, such as "Color" 806 at the first level 802. If a determination is made that assistance may be required for the user to complete the stroke (e.g., if a dwell timer times out), a menu visualization 808 appears. For example, a user may start to draw a stroke 810 and then pause. The menu visualization 808 will appear based on an inference of the stroke the user was intending to draw. The user, upon visualizing the system inferred stroke, can complete the stroke gesture 810.

After selecting the menu item "Color" 806, the first level 802 fades out and the second level (or submenu) 804 appears. The second level 802 can appear at substantially the same place as the first level 802 or at a different place on the display area. The user can select, for example, "Brown" 812. If the system infers that the user needs prompting to complete the action, a menu visualization 814 appears. The user can complete the stroke 816 utilizing the menu visualization 814 as a guide.

It should be noted that stroke 810 is longer than needed to invoke the command. In some embodiments, if the marking menu stroke is extended, it can implement a dragging technique. For example, this feature can be utilized to allow a user to select a command and then transition to a different feature, such as scrolling.

The various embodiments disclosed herein can be applied to various hybrid marking menus. These hybrid menus include position-based menus with orientation-based menus. Generally, the length of the first stroke is analyzed to selectively determine which menu is invoked. A short tap can indicate that the user wishes to access an item in a position-based menu, while a longer stroke is used to directly access an item in an orientation-based menu. For example, frequently used items can be located in the orientation-based menu. Since items in the orientation-based menu do not need an initial tap, they can be access quicker. According to some embodiments, two or more initial taps can allow still further sets of commands to be accessed. However, there may be a corresponding increase in the time necessary to access such commands. In general, hybrid zone and hybrid polygon menus provide strokes that are preceded by zero to N taps, where N is an integer greater than or equal to one, to access M+1 sets of commands, where M is an integer greater than or equal to zero.

Figure 9:
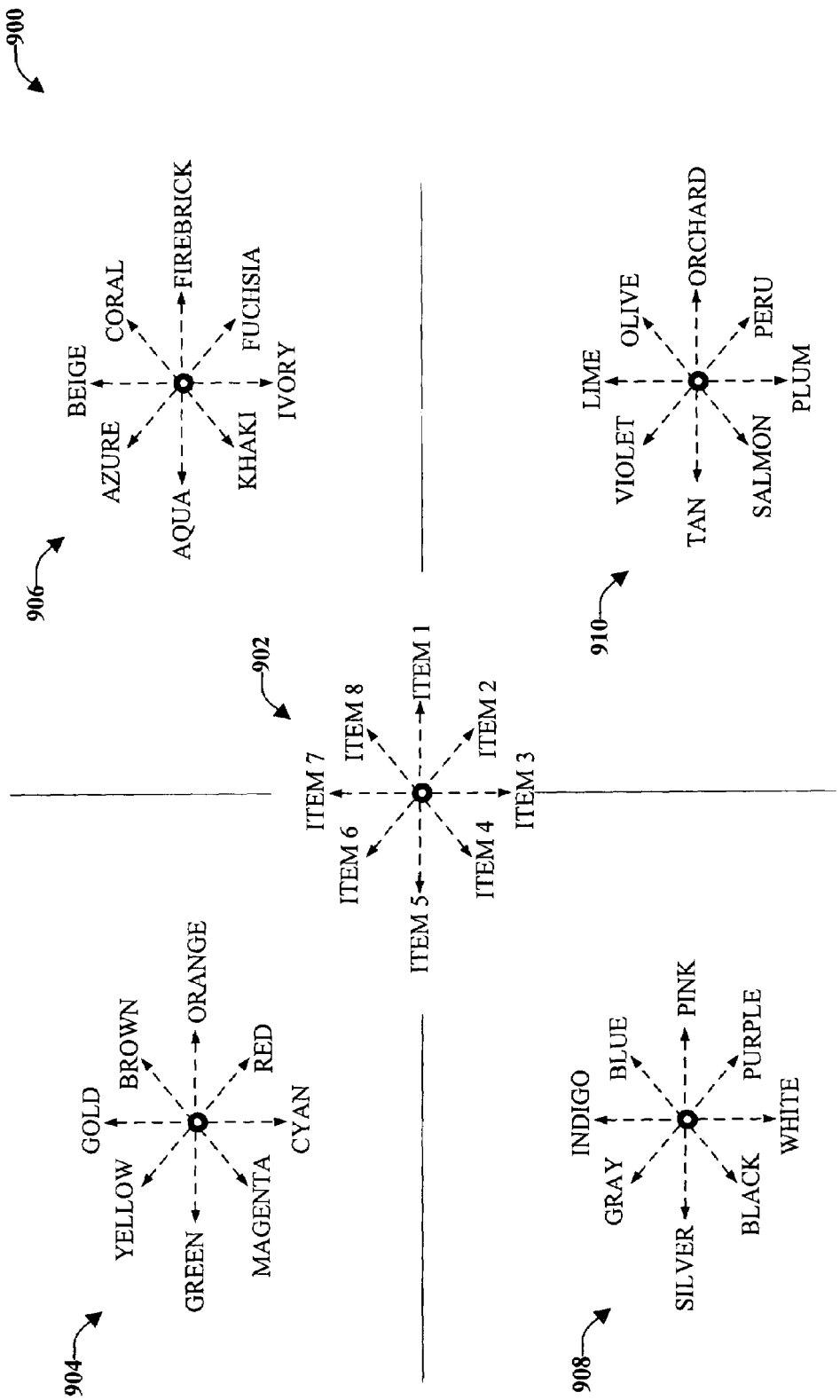
FIG. 9 illustrates a zone orientation hybrid menu according to various embodiments disclosed herein.

FIG. 9 illustrates a zone-orientation hybrid menu 900 according to various embodiments disclosed herein. The zone-orientation hybrid menu 900 includes a simple orientation-based menu 902 and a position-based menu that includes four zones, labeled 904, 906, 908, and 910. As illustrated, zone-orientation hybrid menu 900 can be breadth-40. Depending on the user selection, either the orientation-based menu 902 or the position-based menu is highlighted, indicating which menu is operational.

The length of the first stroke can be analyzed to determine which menu to invoke. A short tap can indicate that the user wishes to access an item in the position-based menu (zones). A short tap will grey out or un-highlight the orientation-based menu 902 because it is inferred that the orientation-based menu 902 will not be utilized by user. A longer stroke can be utilized to provide direct access to an item in the orientation-based menu 902. With a longer stroke, the position-based menu will grey out or fade into the screen background. The position-based menu generally surrounds the orientation-based menu 902. Since accessing the orientation-based menu 902 may not require that initial tap, frequently used items can be placed in the orientation-based menu 902 allowing the user to access these items faster.

Figure 10:
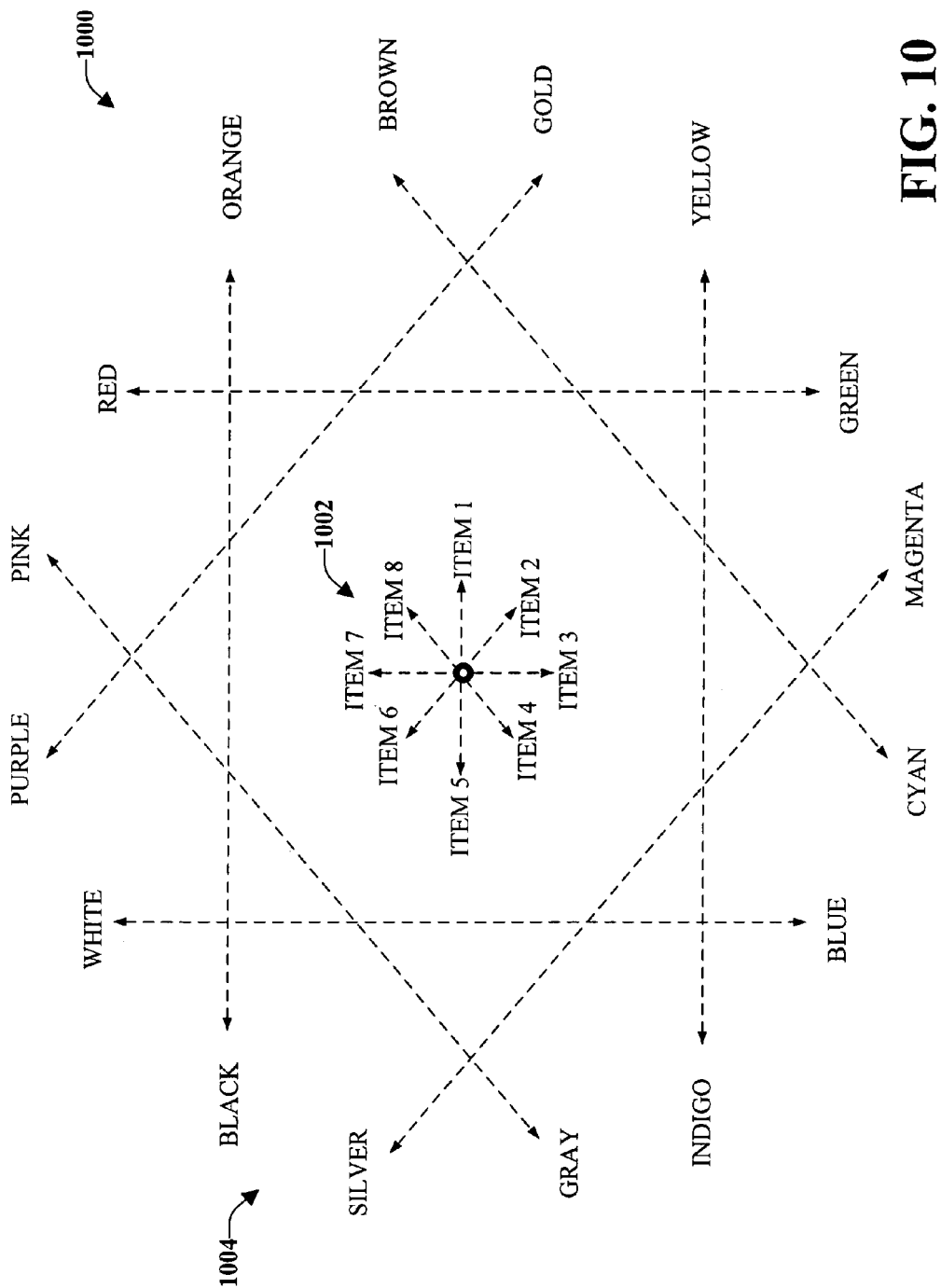
FIG. 10 illustrates a polygon-orientation hybrid menu according to various embodiments disclosed herein.

FIG. 10 illustrates a polygon-orientation hybrid menu 1000 according to various embodiments disclosed herein. As illustrated, polygon-orientation hybrid menu 1000 can have breadth-24. Similar to FIG. 9, the length of a first stroke is analyzed. A short tap can indicate that an item in a position-based menu (illustrated as colors) is to be accessed. A longer stroke can indicate that the user desires to directly access an item in the orientation-based menu 1002. The position-based menu generally surrounds the orientation-based menu 1002. The respective menus will fade or highlight depending on the length of the first stroke.

As menu breadth increase beyond eight items per level, zone and polygon menus can provide better accuracy than orientation-based menus. Even in those embodiments where tapping is utilized to set the menu origin, it should not increase execution speed for the position-based designed. The hybrid designs generally increase the breadth of zone and polygon menus by the number of items in the orientation-based menu. However, the increase in breadth does not extend beyond the top menu level. All strokes after the top level should be interpreted by either the position-based menu or the orientation-based menu. If the first stroke is treated as an orientation-based stroke, the center of the stroke can be used for subsequent zone or polygon strokes.

Figure 11:
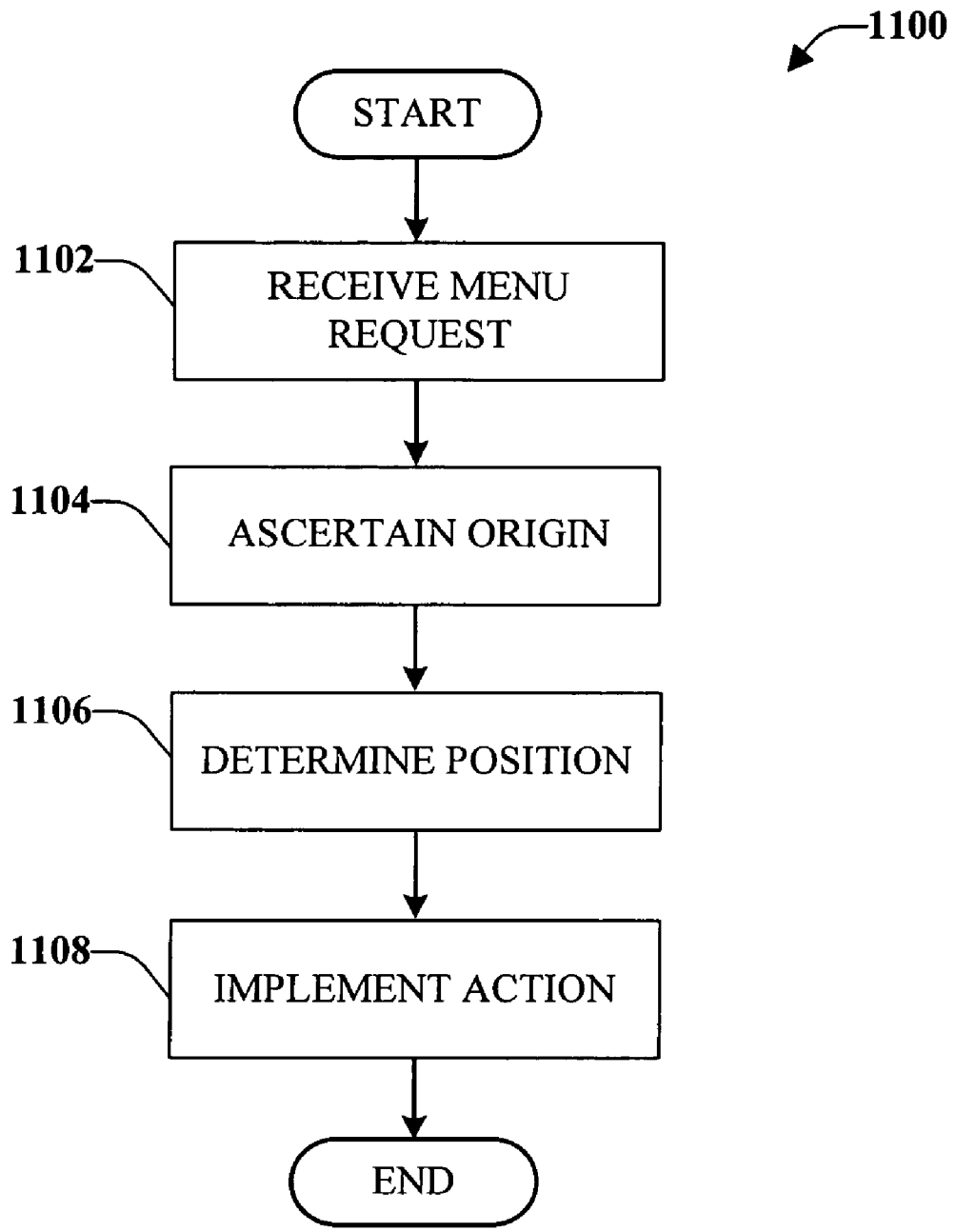
FIG. 11 illustrates a methodology for increasing the breadth of a marking menu.
Figure 12:
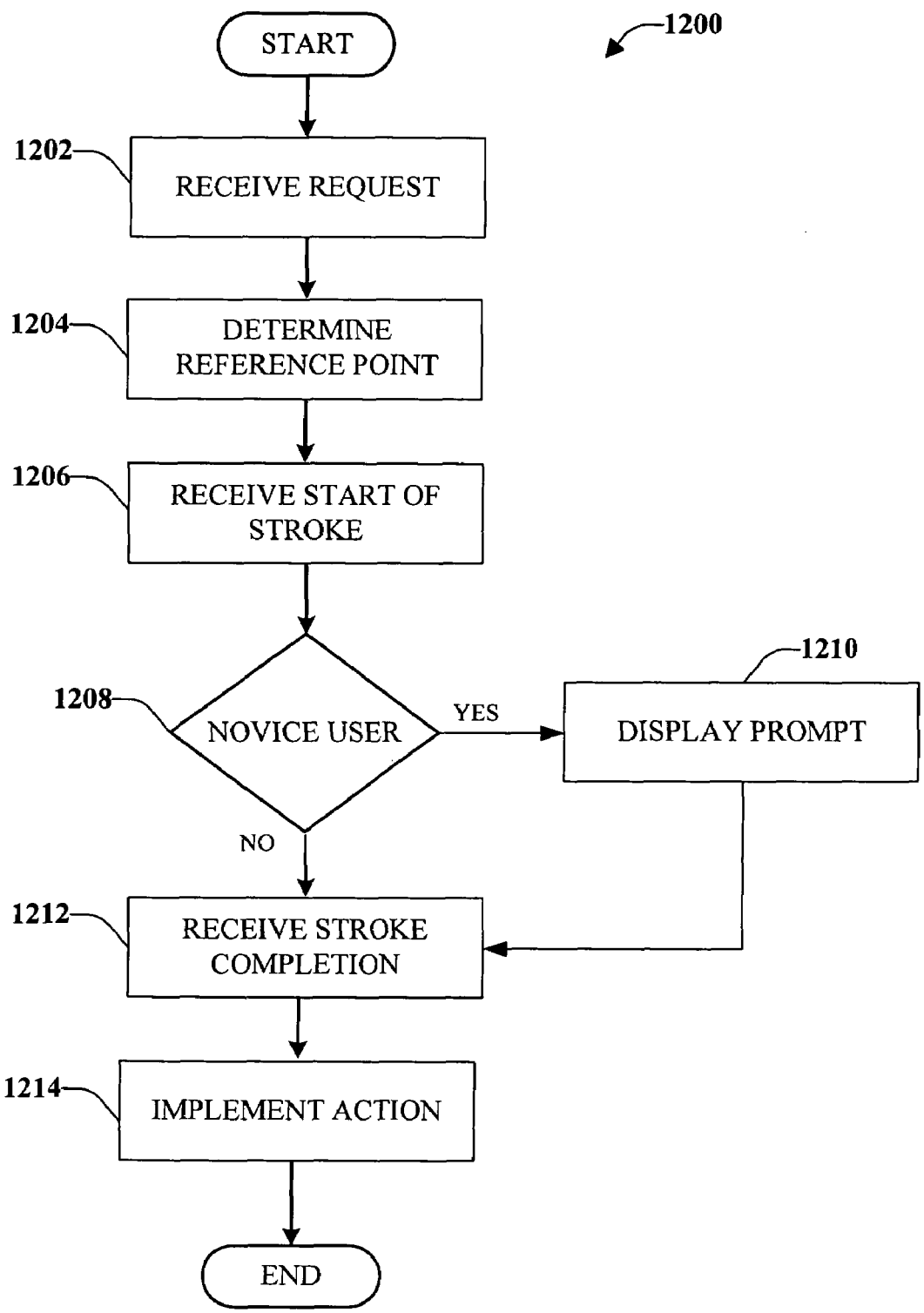
FIG. 12 illustrates another methodology for increasing the breadth of a marking menu.

In view of the exemplary systems shown and described above, methodologies, which may be implemented in accordance with one or more aspects of the various embodiments, will be better appreciated with reference to the diagram of FIGS. 11-12. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Moreover, not all illustrated acts may be required to implement the following methodologies. Those skilled in the art will understand and appreciate that a methodology could alternatively be represented as a series of interrelated states or events, such as in a state diagram.

Referring now to FIG. 11 illustrated is a methodology 1100 for increasing the breadth of a marking menu. At 1102, a request for a menu is received. The request can include a short stroke or tapping action and/or a tension applied to a button (hardware or software). The menu request can be a one level menu or a two or more menu level (e.g., submenu). At 1104, an origin of the menu is determined based on a predetermined origin (e.g., a pre-selected portion of a display to use as the menu area) or based on the tapping action. For example, to use in place selection, a user can specify the origin of the menu or palette with the first stroke. In other embodiments, a fixed origin can be utilized wherein a particular place on the input area is designated as the origin. The user should position subsequent strokes relative to this fixed origin.

At 1106, the position of a subsequent, or the same stroke is determined in relationship to the origin. A subsequent stroke is utilized for menus that receive a tap or another menu activation means to determine the origin point. The same stroke as the received menu request stroke can be utilized for menus that have a predetermined origin. It should also be noted that the same stroke (e.g., a first stroke) can be utilized for menus wherein pressing a button or other tension means is utilized to activate a menu selection.

The determination of the stroke position can include various parameters including a stroke start position and a stroke end position. Parameters can also include the length of the stroke or a curvature of the stroke. It should be understood that some menus can include strokes whose ending position relative to the starting position is the same, however the position of the strokes in relation to the origin point is different, thus providing differentiation between the similar strokes.

At 1108, the action, menu item, command, etc. is automatically implemented. If a tension means or barrel button is utilized, the user can cancel the request at any time by releasing the tension or button. However, other cancellation techniques can be utilized with the disclosed embodiments.

FIG. 12 illustrates another methodology 1200 for increasing the breadth of a marking menu. At 1202 a request to invoke a marking menu is received though various techniques including tapping the screen, drawing a stroke or gesture identified as implementing the menu, or pressing a button or key on a keyboard (e.g., receiving a notification that a button is being depressed). Receiving the request to invoke a menu can also include deciding a menu type to display (e.g., zone, polygon, hybrid, . . . ). A reference point is determined at 1204, which can be a predetermined reference point or a user initiated reference point as determined by a tapping action.

The start of a stroke is received at 1206 and defines the starting position of the gesture as well as the orientation of the stroke around the reference point. A determination is made at 1208 whether the user is a novice user. For example, the user may be a novice user, or might need prompting, if the user hesitates after beginning the stroke. A predetermined dwell time can be utilized whereby after a predetermined amount of time, the user is considered a novice user or a user needing help. Other techniques can be utilized to determine whether the user is a novice user or requires a prompt, such as asking the user through a message if a prompt is desired, a preselection from the user that help would be appreciated, or other interaction techniques.

If the user is a novice user or it is determined that a prompt is necessary ("yes"), a prompt is displayed at 1210. This prompt can include a gradual highlighting or bolding of a recommended stroke based upon the beginning of the stroke (e.g., pen down event) received at 1206. If the user is not a novice user ("no") or after the prompt is displayed at 1210, stroke completion (e.g., pen up event) is received at 1212. Based upon the completed stroke, an action or menu selection can be implemented at 1214. The action implemented can be based in part on the orientation, direction, and/or length of the stroke. For example, a menu action can be automatically implemented based in part of the relative positions of the beginning of the stroke and the completion of the stroke. At any time, the user can cancel the action through a plurality of cancellation techniques (e.g., receiving notification that a button is no longer depressed cancels implementation of the menu action).

Figure 13:
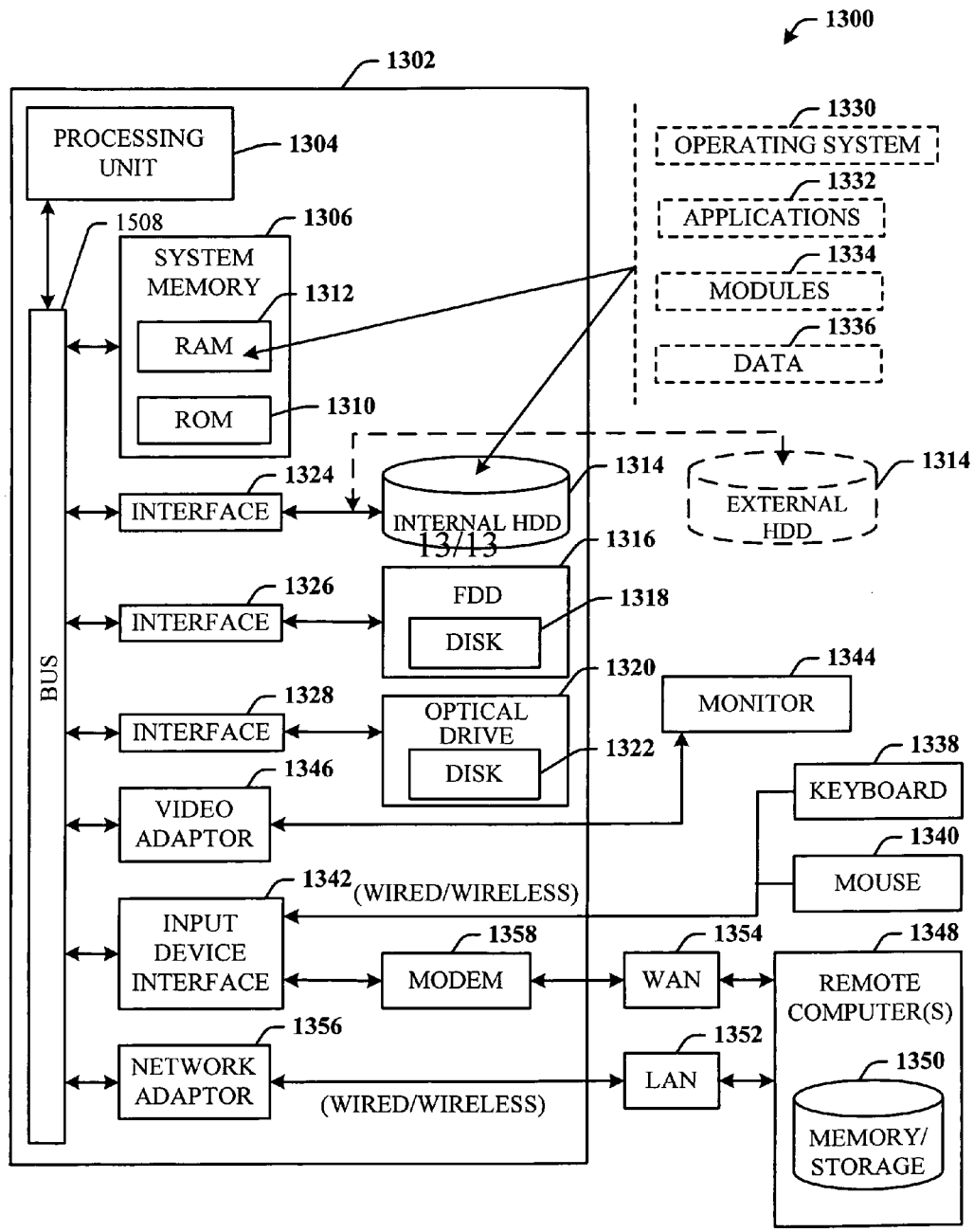
FIG. 13 illustrates a block diagram of a computer operable to execute the disclosed embodiments.

Referring now to FIG. 13, there is illustrated a block diagram of a computer operable to execute the disclosed architecture. In order to provide additional context for various aspects disclosed herein, FIG. 13 and the following discussion are intended to provide a brief, general description of a suitable computing environment 1300 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM)

1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the various embodiments can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates expanding the capabilities of marking menus, comprising:
    at least one processor that executes the following computer executable components stored on a computer readable medium;
    an interface component that receives input;
    a position component that ascertains and displays a point of origin associated with at least one menu, the point of origin is at least one of located in a fixed position in an input area or selected in the input area based at least in part on received input; and
    an orientation component that determines a selection action associated with the at least one menu based at least in part on direction of a stroke, orientation of the stroke, and position of the stroke relative to the point of origin, wherein the at least one menu is divided into a first half-plane zone and a second half-plane zone with a division between the first half plane zone and the second half plane zone running through the point of origin and parallel to orientation of the stroke, and wherein orientation of the first half plane zone and the second half-plane zone is dynamically adjusted based at least in part on the orientation of the stroke, and wherein
    a first selection action, associated with a first direction of the stroke, and a second selection action, associated with a second direction of the stroke, are located in the first half-plane zone, and
    a third selection action, associated with the first direction of the stroke, and a fourth selection action, associated with the second direction of the stroke, are located in the second half-plane zone, wherein the first selection action, the second selection action, the third selection action, and the fourth selection action are determined based at least in part on the orientation of the stroke, and
    the selection action is one of the first selection action, the second selection action, the third selection action, or the fourth selection action, and is determined based at least in part on in which half-plane zone the stroke is positioned and whether the direction of the stroke is in the first direction or the second direction.

2. The system of claim 1, further comprising a length component that ascertains a menu based in part on the length of the stroke.

3. The system of claim 2, the at least one menu is at least one of a polygon menu, a zone menu, a hybrid menu, a zone menu integrated within a tracking menu, or a polygon menu integrated within a tracking menu.

4. The system of claim 1, the position component further determines a zone based in part on the point of origin and a contact point.

5. The system of claim 1, wherein the at least one menu comprises a polygon menu, the polygon menu has N sides, wherein N is an integer number equal to or greater than four, wherein each side of the polygon corresponds to at least one respective selection action, the orientation component determines the selection action based at least in part on the direction of the stroke relative to the respective sides of the polygon menu and the position of the stroke relative to the point of origin and the respective sides of the polygon menu.

6. The system of claim 1, the position component further provides selection visualization, wherein the selection visualization is a prompt that infers a desired action and provides information to facilitate completion of the action.

7. The system of claim 1, the input is a tapping action.

8. The system of claim 1, the input is applied by tension on a button and removal of the button tension before action selection cancels the action.

9. A method for increasing the breadth of marking menus, comprising:
    employing a processor executing computer executable instructions stored on a computer readable storage medium to implement the following acts:
    receiving a request to invoke a menu;
    determining a point of origin associated with the menu;
    receiving a beginning of a stroke;
    receiving a completion of the stroke; and
    implementing a menu action associated with the menu based at least in part on position of the stroke in relation to the point of origin and orientation of the stroke based at least in part on relative position between the beginning of the stroke and the completion of the stroke, wherein the menu is divided into two half-plane zones with division between the two half-plane zones running through the point of origin and substantially parallel to the orientation of the stroke, and wherein
    a first menu action, associated with the orientation of the stroke in a first direction, and a second menu action, associated with the orientation of the stroke in a second direction, are located in a first half-plane zone, and
    a third menu action, associated with the orientation of the stroke in the first direction, and a fourth menu action, associated with the orientation of the stroke in the second direction, are located in a second half plane zone, and
    the menu action is one of the first menu action, the second menu action, the third menu action, or the fourth menu action and is implemented based at least in part on in which half-plane zone the stroke is positioned and whether the orientation of the stroke is in the first direction or the second direction.

10. The method of claim 9, after receiving the beginning of the stroke, further comprising:
    ascertaining if a prompt is to be provided; and
    displaying a visualization tool if it is ascertained that the prompt is to be provided.

11. The method of claim 9, determining a point of origin is based at least in part on a received tapping action.

12. The method of claim 9, wherein the menu is a polygon menu, implementing the menu action further comprising:
    determining at least one side of the polygon menu corresponding to the stroke based at least in part on the orientation of the stroke relative to the respective sides of the polygon menu, wherein the menu is a polygon menu that has a predefined number of sides greater than or equal to four sides and each side of the polygon corresponds to at least one respective menu action;

determining a side of the at least one side corresponding to the stroke based at least in part on position of the stroke in relation to the point of origin; and implementing a menu action corresponding to the determined side.

13. The method of claim 9, receiving a request to invoke a menu further comprising deciding a menu type to display.

14. The method of claim 9, wherein the menu is a zone menu comprising a plurality of zones, implementing the menu action, further comprising:

determining a zone based at least in part on position of the stroke relative to the point of origin;

determining a menu action associated with the zone based at least in part on orientation of the stroke relative to the zone; and implementing the determined menu action.

15. The method of claim 14, receiving notification that the button is no longer depressed cancels implementation of the menu action.

16. The method of claim 9, determining a point of origin comprising pre-selecting a portion of a display area to use as the menu area.

17. A system that increases the breadth of a marking menu, comprising:

at least one processor that executes the following computer executable components stored on a computer readable medium;

means for determining a point of origin associated with the marking menu;

means for receiving a pen down event;

means for receiving a pen up event;

means for comparing the relative position of the pen up event in relation to the pen down event to determine a stroke; and means for automatically initiating a menu command associated with the marking menu based at least in part on orientation of the stroke and position of the stroke relative to the point of origin, wherein the marking menu is divided into two half-plane zones with division between the two half-plane zones running through the point of origin and substantially parallel to the orientation of the stroke, and wherein a first menu command, associated with the orientation of the stroke in a first direction, and a second menu command, associated with the orientation of the stroke in a second direction, are located in a first half-plane zone, and a third menu command, associated with the orientation of the stroke in the first direction, and a fourth menu command, associated with the orientation of the stroke in the second direction, are located in a second half-plane zone, and and the menu command is one of the first menu command, the second menu command, the third menu command, or the fourth menu command and is initiated based at least in part on in which half-plane zone the stroke is positioned and whether the orientation of the stroke is in the first direction or the second direction.

18. The system of claim 17, further comprising means for selectively applying a defined menu origin.

19. The system of claim 17, further comprising:

means for analyzing a length of the stroke; and means for selectively invoking the marking menu based at least in part on the length of the stroke.

20. The system of claim 17, further comprising:

means for receiving a tension input; and means for invoking the menu selection while the tension input is received and canceling the menu selection if the tension input is no longer received.

* * * * *